United States Patent [19]

Theslof, Jr.

[11] Patent Number: 4,521,091
[45] Date of Patent: Jun. 4, 1985

[54] SLIDE PRODUCTION SYSTEM

[75] Inventor: Gene Theslof, Jr., North Saint Paul, Minn.

[73] Assignee: Custom Laboratories, Inc., Minneapolis, Minn.

[21] Appl. No.: 421,854

[22] Filed: Sep. 23, 1982

Related U.S. Application Data

[63] Continuation of Ser. No. 116,840, Jan. 30, 1980, abandoned.

[51] Int. Cl.³ .............................................. G03B 23/08
[52] U.S. Cl. ..................................................... 353/122
[58] Field of Search .............. 206/455, 456, 425, 444; 353/120–122, 30, 117, 25–27; 40/377, 158 B, 159; 33/1 C, 1 K, 1 BB, 1 B, 184.5; 355/125

[56] References Cited

U.S. PATENT DOCUMENTS

| | | | |
|---|---|---|---|
| 1,403,677 | 1/1922 | Faas | 355/125 |
| 1,477,131 | 12/1923 | Kulik | 40/158 B |
| 1,977,667 | 10/1934 | Breitkreuz | 206/449 |
| 2,138,293 | 11/1938 | Comino | 33/184.5 |
| 2,527,765 | 10/1950 | Roehrl | 40/159 |
| 2,701,635 | 2/1955 | Mills | 206/425 X |
| 3,683,779 | 8/1972 | Lifton | 353/30 |
| 3,843,246 | 10/1974 | Johannsen | 353/117 |
| 3,980,402 | 9/1976 | Holliday | 353/120 X |
| 4,204,753 | 5/1980 | Kool et al. | 353/117 X |
| 4,255,872 | 3/1981 | Williams | 206/456 X |

*Primary Examiner*—Harry N. Haroian
*Attorney, Agent, or Firm*—Merchant, Gould, Smith, Edell, Welter & Schmidt

[57] ABSTRACT

A slide production kit comprising a library (110) of pictorial individual slides (115) categorized by subject matter, libraries (116, 120) of individual slides (121, 122) exemplary of available physical and optical characteristics for customized slides, a carousel library (130) of multiple image slides (131) each presenting slides from a single category of one of the libraries, cropping matrix, and panoramic guides, and an index (140) of selectable multiple image positions and cropping sizes and locations, all whereby to enable a user without photographic laboratory equipment to select, inspect and edit customized slides pertinent to his needs.

12 Claims, 12 Drawing Figures

SLIDE PRODUCTION SYSTEM

This is a continuation of application Ser. No. 116,840, filed Jan. 30, 1980.

BACKGROUND

A problem frequently faced by the sales promotion personnel of small business organizations is the production of acceptable visual aids such, for example, as a set of slides illustrating the construction, operation, and advantages of a new product. A presentation of this sort is most effective if produced with photographic finesse, that is, with not merely the slides illustrative of the product itself, but with appropriate title slides, or with multiple image presentation, or with suitable backgrounds, to name but a few possible enhancements. Desirable sophistications are of course known to such personnel, hereafter referred to as the customer, but most of them require extensive and costly photographic laboratory equipment and trained personnel not available to them.

BRIEF DESCRIPTION OF THE INVENTION

The present invention comprises a system by which customers without extensive photographic equipment are enabled to create, by verbal direction, visual aids of high technical excellence and advanced sophistication, so that they have effective impact on the viewers. It enables a customer to quickly scan a large stock of slides that have widely different subject matter, to closely inspect slides selected by such scanning and select those especially pertinent for a particular purpose, and to edit their arrangement and combination to accomplish the purpose, so that a properly equipped photographic laboratory can produce on verbal order exactly the effect desired by the customer, either independently of or in connection with proprietary slides of the customer's own preparation.

To accomplish this the inventive system comprises a first library of individual pictorial slides, categorized by subject matter, a second library or individual exemplary slides categorized by title type faces, title treatments, and background colors, and a third library of individual exemplary slides categorized by possible optical services. In addition the system includes a carousel library of multiple image slides, each slide presenting images of slides in a category of one of the libraries first mentioned, every available slide therein being found in miniature in one of the slides of that carousel library. The system further includes indices of the categories, and an illustrated index of selectable multiple image positions and cropping sizes and locations, with appropriate cropping, panoramic, and matrix guides. These components coact to enable a customer with limited photographic facilities, or with none at all, to scan, select from, and inspect in detail a great number of potentially usable slides, and to in effect edit their composition by verbal instructions into customized slides ideally suited for his specific purposes.

Various advantages and features of novelty which characterize my invention are pointed out with particularity in the claims annexed hereto and forming a part hereof. However, for a better understanding of the invention, its advantages, and objects attained by its use, reference should be had to the drawing which forms a further part hereof, and to the accompanying descriptive matter, in which there is illustrated and described a preferred embodiment of the invention.

DESCRIPTION OF THE INVENTION

Figure 1:
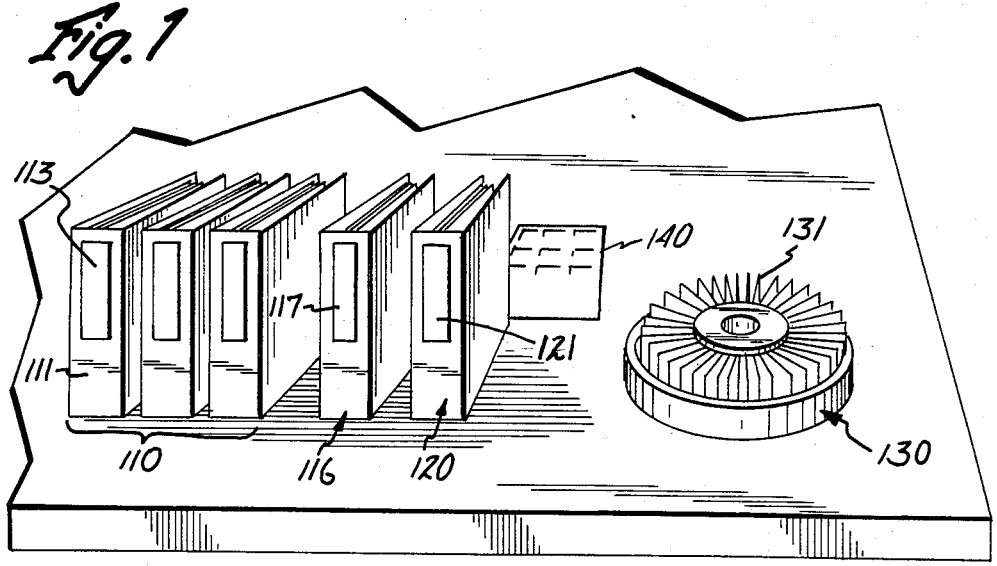
FIG. 1 is a view illustrating components of the slide production system.
Figure 2:
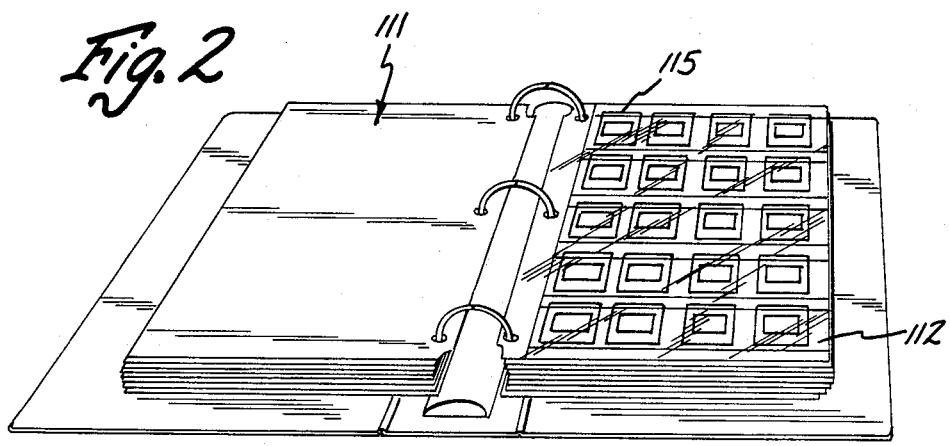
FIG. 2 is a perspective view of a portion of a library of individual slides.

Reference should first be made to FIG. 1, which shows the invention to comprise a first library 110 in which there are stored a large number of individual pictorial slides of general or topical interest. The slides are categorized according to content, and are stored in accordance with their categorizations. While this library can take any form having convenient access, the drawing shows the slides to be stored in appropriate pockets in pages of one or more albums 111: the number of pages and of albums is determined by the total number of available slides. FIG. 2 shows an album 111 opened to a particular page 112 containing all or some of the slides categorized in a particular category. An index to the categories of the slides contained in album 111 may be provided on the cover, as shown at 113 in FIG. 1. By way of illustration, a typical category index reads in part as follows:

| Categories | | | |
|---|---|---|---|
| 1. | Advertising | 43. | Mountain Scenes |
| 2. | Agriculture | 44. | Ocean Scenes |
| 3. | Airplanes | 45. | Office |
| 4. | Airport | 46. | Oil/Gasoline |
| 5. | Animals | 47. | Old Age |
| 6. | Architecture | 48. | Old Things |
| 7. | Automobiles | 49. | People |

Figure 4:
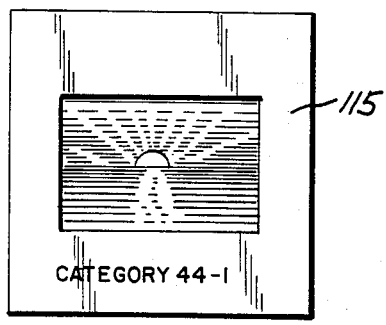
FIG. 4 is a view of a pictorial slide from a first library.

Each page 112 of album 111 has pockets 114 for a standard number of slides, such as twenty. If a category contains less than twenty slides, pockets are left unoccupied, so that no page contains slides of more than one category: if there are more than twenty slides in the category, two or more album pages can be devoted to that category. For added convenience in the identification of slides and their orderly replacement after removal, each side is preferably given a number in this category. For example, the slide in FIG. 2 indicated by reference numeral 115 may be identified as slide 1, category 44, as is indicated in FIG. 4: the pictorial showing in the figure is of course schematic.

Figure 5:
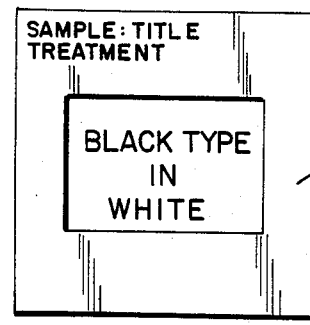
FIG. 5 is a view of an exemplary slide from a second library.
Figure 6:
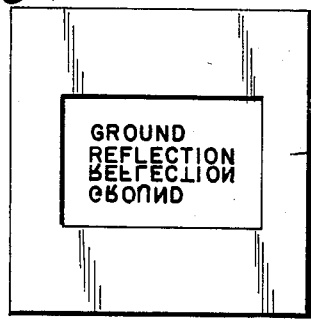
FIG. 6 is a view of an exemplary slide from a third library.

In addition to the library 110 of pictorial slides, the kit includes two further libraries of exemplary slides representative of optical additions and variations, stored in the same fashion. Library 116, having an index 117, is of slides of optical additions categorized by title type faces, title treatments, and background colors, and library 120, having an index 121, is of slides exemplary of available optical variatons, as for example, plural images or ground reflections, to which the user may resort to add interest or impact to the presentation. A single album may be sufficient to store both libraries 116 and 120. FIG. 5 shows a slide 122 exemplary of the slides in library 116, and FIG. 6 shows a slide 123 exemplary of the slides in library 120.

Figure 3:
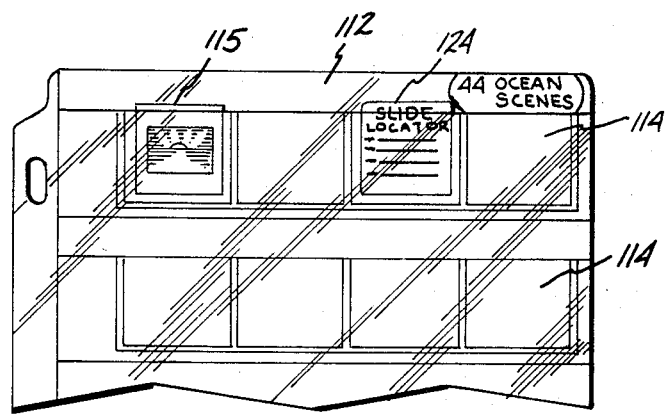
FIG. 3 is an enlarged view of a portion of a page from the library of FIG. 2.

Occasion often arises to remove a slide from its pocket and page, for temporary use elsewhere. This leaves the library incomplete, and when a number of persons make use of this system, access to a missing slide on short notice may be imperative. Accordingly, slide locators may be provided, to be inserted in a pocket when the slide is removed, after being marked to indicate the temporary location of the missing slide. Such an indicator is shown at 124 in FIG. 3.

Figure 7:
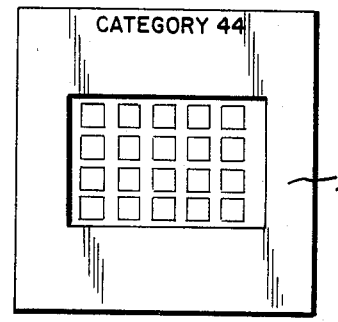
FIG. 7 is a view of a slide from a carousel library.

A very important part of my invention is a carousel library 130 of multiple image slides 131. Each slide 131 in this library contains reduced images of the individual slides in an album page, as shown in FIG. 7. By projection of the slides in the carousel a customer can very rapidly scan categories of interest, or even an entire library, and identify slides of special importance for subsequent removal from the libraries and study in detail.

Figure 8:
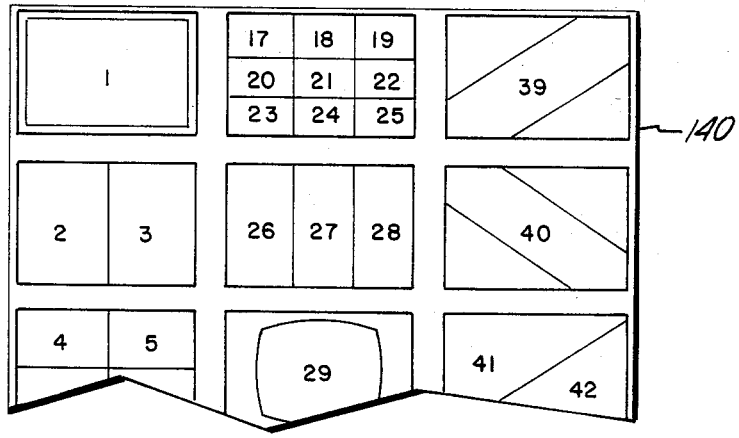
FIG. 8 is a fragmentary showing of an index forming a part of the system.

Attention is now directed to FIG. 8, which is a portion of an index 140 of multiple image positions and cropping sizes and locations forming a part of the kit. For example, if it is desired to have a customized slide in which one slide selected from one of the libraries is used as background and a portion of another slide, or a title, is used diagonally thereacross, the index display identified by Arabic number 39 in FIG. 8 defines the desired relation.

My invention also provides means about to be described, including a matrix guide and a cropping guide, by which a customer can verbally instruct a remote laboratory how to prepare an enlargement of a portion of a slide, without pointing to the desired area in a personal conference, and without even having to supply a marked up copy of the proprietary slide in question.

Figure 9:
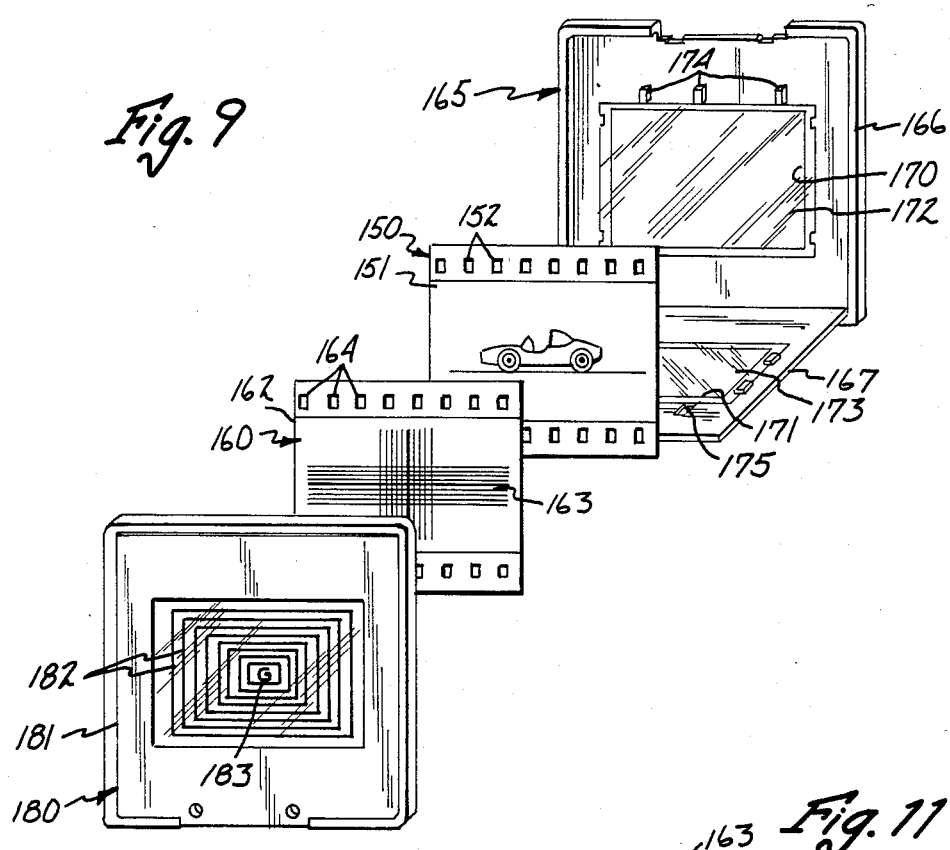
FIGS. 9-12 show a pair of guides and their use in the inventive system.

Referring to FIG. 9, the customer's proprietary slide 150 is shown as an unmounted single frame of photographic film 151 bearing the selected image. The film has standard sprocket holes 152 along its edges.

My matrix guide 160 comprises a similar unmounted frame of film 162 on which there is photographically reproduced a grid 163 of mutually perpendicular lines, marginally numbered horizontally and vertically, and regularly spaced by one millimeter. For convenience, the central lines may be emphasized. This film is also provided with sprocket holes 164. Coacting with grid film 162 is a film mount or holder 165 made up of pivotally interconnected portions 166 and 167 having central viewing openings 170 and 171, preferably closed by transparent panes 172, 173 of protective material. Shallow pegs 174 project inwardly into portion 166, and may enter shallow indentations 175 in portion 167 when holder 165 is closed. Pegs 174 are spaced and positioned to coact with the sprocket holes of films 160 and 162, so as to locate the films in centered position in holder 165, and to maintain them in fixed position relative to one another when holder 165 is pivoted closed.

My cropping guide 180 comprises a slide 181, which may be permanently mounted, and on which are photographically printed a set of rectangles 182 of successively larger area and all having the ratio, length to width, of a standard 35 mm slide, namely 35×22 mm. The rectangles are identified by internal letters 183, and indicate the respective areas which will become full size slides upon enlargement. Note that guides 160 and 180 are entirely independent physically.

OPERATION

The method of use of the invention will now be described, for several different applications. In the first application the customer has available a number of slides of its own production, showing in black-and-white a structure for presentation. The concept of preparing a single slide showing several of these black-and-whites, in a color other than black-and-white, is under consideration. Recourse is had to carousel library 130 for slides from library 116 illustrating available colors, and when a few exemplary slides have been selected as of possible desirability, the individual exemplary slides are withdrawn from library 116 and inspected more closely, thus enabling the reasoned choice of a particular color for a customized slide. Reference is next had to index 140, and the shapes of the objects shown in the black and white slides are considered for possible use in a multiple image slide. It may be considered, for example, that three of the black and white slides may effectively be presented in a single slide in the positions 26, 27, 28 of FIG. 8. This color choice and position selection enables the customer to quickly and verbally direct the production of a customized slide of its own creation, without any photographic equipment other than the camera which took their black and white pictures, development of which can of course easily be obtained commercially. The customer only needs to supply the proprietary slides he wants made, and identify the selected color slide and the chosen position numbers, and the photographic laboratory is thereby enabled to create from the customer's slides exactly the slide desired.

As a second example, the customer may feel the need of a title slide to introduce its presentation. Suppose the product in question is an agricultural device: the decision can be made to use a pictorial slide as a background for the title, and carousel library 130 is scanned, in its pertinent categories, for subject matter of possible utility: potentially useful slides are found in library 110 and are inspected in their normal rather than reduced presentation, and a choice for a background illustration is made. The carousel library is again scanned for sizes and characteristics of type fonts and possible optical enhancements, and candidate slides are drawn from the libraries, inspected, and selected. The final choice may be a particular type font in a selected color, with an apparent ground reflection appearing across the background illustration. Again, the customer has created a customized slide, this time without even the use of a camera, simply by specifying the numbers of selected slides from the libraries.

Consider now as a third example the case of a customer interested in preparing a visual aid slide having to do with automobile ties, and possessing a proprietary slide (film 151 in FIG. 9) showing an automobile equipped with one of the tires in question. The showing of the tire is too small to present the tire effectively, but an enlargement of a portion of the proprietary slide would give the visual aid desired.

Figure 10:
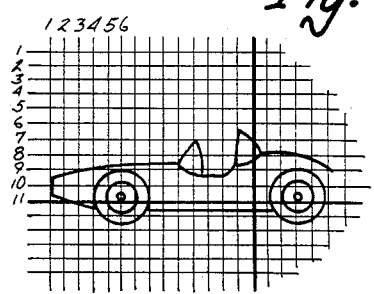

The customer opens mount 165, positions his film 151 and guide film 160 on pegs 174 so that both are centered in the viewing openings 170 and 171, and closes the holder. The appearance of the slide is now as shown in FIG. 10: any point on film 150 can be defined in terms of coordinates determined by the grid on film 160. For example, the center of the front wheel is at horizontal 6, vertical 11.

Figure 11:
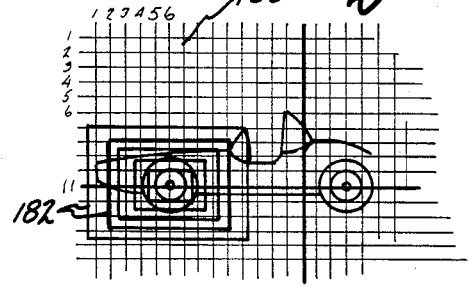
Figure 12:
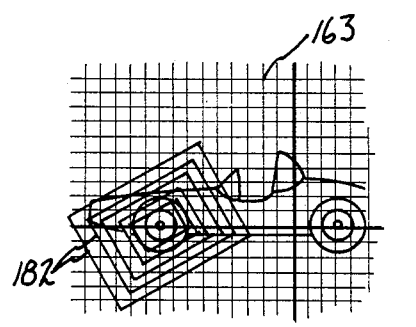

Now the customer positions guide 180 on mount 165 so that the rectangles enclose the wheel (see FIG. 11), and selects one of the rectangles in accordance with the amount of enlargement desired, rectangle G resulting in the greatest enlargement. By reading the grid lines on film 160 against the horizontal and vertical sides of the selected rectangle, the area to be enlarged is determined and can be described verbally. It is even possible, by giving the coordinates of two corners of a rectangle, as shown in FIG. 12, to have the enlargement canted at an desired angle compared to the original.

From the above it will be evident that I have invented a system which enables customers with minimum or no photographic equipment to select, compose, and edit customized slides for use in visual presentations. This kit is in a form easily stored and readily accessible, so that the desired results are accomplished quickly and efficiently, and the resources available for selection are far beyond those accessible to a small business organization.

It will be appreciated that the procedures taught here are equally applicable for the preparation of film strips, sets of viewgraphs, and similar visual aid arrangements.

What is claimed is:

1. A slide production kit comprising:
   a first library of individual pictorial slides depicting a plurality of different subjects with a plurality of slides for each subject, each of said slides bearing indicia identifying the slide by category and indicia specifically identifying the slide within said category;
   first means for categorizing the slides of the first library by subject matter and for housing said slides in a manner which uniquely identifies each slide, said means including album pages constructed and arranged so as to physically separate said slides by category;
   a second library including a first plurality of multiple-image slides each of which includes images of the slides in one of the categories of said first library;
   second means for housing the slides of the second library, said second means being constructed and arranged to permit selected presentation of said multiple-image slides and review of the subject matter depicted by each;
   a third library of individual exemplary slides representative of optical additions and variations, the subject matter of which may be selectively merged with an individual pictorial slide to achieve a desired presentation;
   third means for housing the slides of the third library in predetermined categories; and
   an index of selected multiple-image positions, cropping sizes and locations;
   with said second library further including a second plurality of multiple-image slides each of which includes images of the slides in one of the categories of the third library.

2. The combination defined by claim 1, which further comprises a matrix guide comprising:
   a generally transparent photographic film on which is printed a grid of intersecting, mutually perpendicular lines, said film being provided with a standard set of film sprocket holes;
   and holder means having a plurality of pegs positioned to engage said sprocket holes and to fix the position of said film and any other film engaging said pegs.

3. The combination defined by claim 1, which further comprises a cropping guide comprising:
   a generally transparent photographic film on which is imprinted a plurality of similar rectangles of different sizes, the rectangles being disposed relative to a common center and having a ratio of length to width which corresponds to that of a standard photographic slide.

4. The combination defined by claim 3, wherein the cropping guide further comprises indicia respectively identifying the respective rectangles.

5. A slide production kit comprising:
   a first library of individual pictorial slides depicting a plurality of different subjects with a plurality of slides for each subject;
   first means for categorizing the slides of the first library by subject matter and for housing said slides in a manner which uniquely identifies each slide;
   a second library of multiple-image slides each of which includes images of the slides in one of the categories of said first library;
   second means for housing the slides of the second library in a manner which permits selected prsentation of said multiple-image slides and review of the subject matter depicted by each; and
   a matrix guide having a generally transparent photographic film on which is printed a grid of intersecting, mutually perpendicular lines, said film being provided with a standard set of film sprocket holes, and holder means having a plurality of pegs positioned to engage said sprocket holes and to fix the position of said film and any other film engaging said pegs.

6. A slide production kit comprising:
   a first library of individual pictorial slides depicting a plurality of different subjects with a plurality of slides for each subject;
   first means for categorizing the slides of the first library by subject matter and for housing said slides in a manner which uniquely identifies each slide;
   a second library of multiple-image slides each of which includes images of the slides in one of the categories of said first library;
   second means for housing the slides of the second library in a manner which permits selected presentation of said multiple-image slides and review of the subject matter depicted by each;
   a matrix guide having a generally transparent photographic film on which is printed a grid of intersecting, mutually perpendicular lines, said film being provided with a standard set of film sprocket holes, and holder means having a plurality of pegs positioned to engage said sprocket holes and to fix the position of said film and any other film engaging said pegs; and
   a cropping guide comprising a generally transparent photographic film on which is imprinted a plurality of similar rectangles of different sizes, the rectangles being disposed relative to a common center and having a ratio of length to width which corresponds to that of a standard photographic slide.

7. The combination defined by claim 6, wherein the cropping guide further comprises indicia respectively indentifying the respective rectangles.

8. A slide production kit comprising:
- a first library of individual pictorial slides depicting a plurality of different subjects with a plurality of slides for each subject, each of said slides bearing indicia identifying the slide by category and indicia specifically identifying the slide within said category;
- first means for categorizing the slides of the first library by subject matter and for housing said slides in a manner which uniquely identifies each slide, said means being constructed and arranged so as to physically separate said slides by category;
- a second library of multiple-image slides each of which includes images of the slides in one of the categories of said first library;
- second means for housing the slides of the second library, said second means being constructed and arranged to permit selected presentation of said multiple-image slides and review of the subject matter depicted by each;
- a third library of individual exemplary slides representative of optical additions and variations, the subject matter of which is arranged to allow selective merger with an individual pictorial slide so as to achieve a particular presentation;
- third means for housing the slides of the third library in predetermined categories; and
- a matrix guide comprising a generally transparent photographic film on which is printed a grid of intersecting, mutually perpendicular lines, said film being provided with a standard set of film sprocket holes, and holder means having a plurality of pegs positioned to engage said sprocket holes and to fix the position of said film and any other film as said film and said other film engage said pegs.

9. A slide production kit comprising:
- a first library of individual pictorial slides depicting a plurality of different subjects with a plurality of slides for each subject, each of said slides bearing indicia identifying the slide by category and indicia specifically identifying the slide within said category;
- first means for categorizing the slides of the first library by subject matter and for housing said slides in a manner which uniquely identifies each slide, said means being constructed and arranged so as to physically separate said slides by category;
- a second library of multiple-image slides each of which includes images of the slides in one of the categories of said first library;
- second means for housing the slides of the second library, said second means being constructed and arranged to permit selected presentation of said multiple-image slides and review of the subject matter depicted by each;
- a third library of individual exemplary slides representative of optical additions and variations, the subject matter of which is arranged to allow selective merger with an individual pictorial slide so as to achieve a particular presentation;
- third means for housing the slides of the third library in predetermined categories;
- and an index of selected multiple-image positions, cropping sizes and locations.

10. A slide production kit comprising:
- a first library of individual pictorial slides depicting a plurality of different subjects with a plurality of slides for each subject, each of said slides bearing indicia identifying the slide by category and indicia specifically identifying the slide within said category;
- first means for categorizing the slides of the first library by subject matter and for housing said slides in a manner which uniquely identifies each slide, said means being constructed and arranged so as to physically separate said slides by category;
- a second library of multiple-image slides each of which includes images of the slides in one of the categories of said first library;
- second means for housing the slides of the second library, said second means being constructed and arranged to permit selected presentation of said multiple-image slides and review of the subject matter depicted by each;
- a third library of individual exemplary slides representative of optical additions and variations, the subject matter of which is arranged to allow selective merger with an individual pictorial slide so as to achieve a particular presentation;
- third means for housing the slides of the third library in predetermined categories;
- and a matrix guide comprising
  - a generally transparent photographic film on which is printed a grid of intersecting, mutually perpendicular lines, said film being provided with a standard set of film sprocket holes;
  - and holder means having a plurality of pegs positioned to engage said sprocket holes and to fix the position of said film and any other film engaging said pegs.

11. The combination defined by claim 10 which further comprises a cropping guide comprising:
- a generally transparent photographic film on which is imprinted a plurality of similar rectangles of different sizes, the rectangles being disposed relative to a common center and having a ratio of length to width which corresponds to that of a standard photographic slide.

12. A slide production kit comprising:
- a first library of individual pictorial slides depicting a plurality of different subjects with a plurality of slides for each subject, each of said slides bearing indicia identifying the slide by category and indicia specifically identifying the slide within said category;
- first means for categorizing the slides of the first library by subject matter and for housing said slides in a manner which uniquely identifies each slide, said means being constructed and arranged so as to physically separate said slides by category;
- a second library of multiple-image slides each of which includes images of the slides in one of the categories of said first library;
- second means for housing the slides of the second library, said second means being constructed and arranged to permit selected presentation of said multiple-image slides and review of the subject matter depicted by each;
- a third library of individual exemplary slides representative of optical additions and variations, the subject matter of which is arranged to allow selective merger with an individual pictorial slide so as to achieve a particular presentation;

third means for housing the slides of the third library in predetermined categories;

and a cropping guide comprising
a generally transparent photographic film on which is imprinted a plurality of similar rectangles of different sizes, the rectangles being disposed relative to a common center and having a ratio of length to width which corresponds to that of a standard photographic slide.

* * * * *